(12) United States Patent
Moon et al.

(10) Patent No.: US 10,979,709 B2
(45) Date of Patent: Apr. 13, 2021

(54) IMAGE ENCODING METHOD/DEVICE, IMAGE DECODING METHOD/DEVICE AND RECORDING MEDIUM HAVING BITSTREAM STORED THEREIN

(71) Applicant: Industry Academy Cooperation Foundation of Sejong University, Seoul (KR)

(72) Inventors: Joo Hee Moon, Seoul (KR); Dong Jae Won, Goyang-si (KR); Sung Won Lim, Seoul (KR)

(73) Assignee: Industry Academy Cooperation Foundation of Sejong University, Seoul (KR)

(*) Notice: Subject to any disclaimer, the term of this patent is extended or adjusted under 35 U.S.C. 154(b) by 0 days.

(21) Appl. No.: 16/341,830

(22) PCT Filed: Oct. 12, 2017

(86) PCT No.: PCT/KR2017/011215
§ 371 (c)(1),
(2) Date: Apr. 12, 2019

(87) PCT Pub. No.: WO2018/070788
PCT Pub. Date: Apr. 19, 2018

(65) Prior Publication Data
US 2019/0335173 A1    Oct. 31, 2019

(30) Foreign Application Priority Data

Oct. 14, 2016  (KR) .................. 10-2016-0133756
Sep. 29, 2017  (KR) .................. 10-2017-0127941

(51) Int. Cl.
*H04N 19/119*  (2014.01)
*H04N 19/176*  (2014.01)
(Continued)

(52) U.S. Cl.
CPC ........ *H04N 19/119* (2014.11); *H04N 19/129* (2014.11); *H04N 19/159* (2014.11);
(Continued)

(58) Field of Classification Search
CPC .................................................. H04N 19/119
(Continued)

(56) References Cited

U.S. PATENT DOCUMENTS

2013/0003828 A1    1/2013  Cohen et al.
2014/0362926 A1*  12/2014  Rosewarne ............ H04N 19/60
                                                                         375/240.18

FOREIGN PATENT DOCUMENTS

KR    10-2013-0084308 A    7/2013
KR    10-2014-0126370 A    10/2014
(Continued)

OTHER PUBLICATIONS

International Search Report dated Jan. 22, 2018 in corresponding International Application No. PCT/KR2017/011215 (3 pages in English, 3 pages in Korean).

*Primary Examiner* — Yulin Sun
(74) *Attorney, Agent, or Firm* — NSIP Law

(57) ABSTRACT

The present invention provides an image encoding method and an image decoding method. The image decoding method, according to the present invention, comprises the steps of: determining a transformation performing region; segmenting the determined transformation performing region into at least one sub-transform block by using at least one of quadtree segmentation and binary tree segmentation; and performing inverse transformation on the at least one sub-transform block.

16 Claims, 17 Drawing Sheets

(51) Int. Cl.
    *H04N 19/129*     (2014.01)
    *H04N 19/159*     (2014.01)
    *H04N 19/593*     (2014.01)
    *H04N 19/61*     (2014.01)

(52) U.S. Cl.
    CPC ......... *H04N 19/176* (2014.11); *H04N 19/593* (2014.11); *H04N 19/61* (2014.11)

(58) Field of Classification Search
    USPC .................................................. 375/240.02
    See application file for complete search history.

(56) References Cited

FOREIGN PATENT DOCUMENTS

| | | |
|---|---|---|
| KR | 10-2015-0009503 A | 1/2015 |
| KR | 10-1607782 B1 | 3/2016 |
| WO | WO 2012/061298 A1 | 5/2012 |
| WO | WO 2013/003743 A1 | 1/2013 |
| WO | WO 2013/152401 A1 | 10/2013 |

\* cited by examiner

IMAGE ENCODING METHOD/DEVICE, IMAGE DECODING METHOD/DEVICE AND RECORDING MEDIUM HAVING BITSTREAM STORED THEREIN

CROSS REFERENCE TO RELATED APPLICATION

This application is a U.S. National Stage Application of International Application No. PCT/KR2017/011215, filed on Oct. 12, 2017, which claims the benefit under 35 USC 119(a) and 365(b) of Korean Patent Application No. 10-2016-0133756, filed on Oct. 14, 2016, and Korean Patent Application No. 10-2017-0127941, filed on Sep. 29, 2017 in the Korean Intellectual Property Office, the entire disclosures of which are incorporated herein by reference for all purposes.

TECHNICAL FIELD

The present invention relates to an image encoding/decoding method and apparatus. More particularly, the present invention relates to an image encoding method and an image decoding method, the methods being capable of adaptively determining a secondary transform performing area, and a partition shape of a sub transform block of the corresponding area.

BACKGROUND ART

In recent years, demand for multimedia data such as video has been rapidly increasing on the Internet. However, it is hard for development of technology for improving channel bandwidths to keep up with the rapid changes in the demand for multimedia data. In order to solve this problem, VCEG (video coding expert group) of ITU-T which is the internal organization for standards and MPEG (moving picture expert group) of ISO/IEC are continuously collaborating to establish improved video compression standards.

Video compression consists largely of intra prediction, inter prediction, transform, quantization, entropy coding, and in-loop filtering. Among them, intra prediction is a technique of generating a prediction block for a current block by using reconstructed pixels existing around the current block.

Conventional image encoding/decoding methods and apparatuses have their limitation in improving coding efficiency because the conventional methods and apparatuses perform transform without determining a performing area separately.

DISCLOSURE

Technical Problem

An objective of the present invention is to provide an image encoding/decoding method and apparatus, wherein compression efficiency is improved.

In addition, the present invention provides an image encoding/decoding method and apparatus, the method and apparatus being capable of adaptively determining a transform performing area in a transform block, and a partition shape of a sub transform block within the transform performing area so as to improve image encoding/decoding efficiency.

In addition, the present invention provides an image encoding/decoding method and apparatus, the method and apparatus being capable of adaptively determining a scan method of a sub transform block within a sub transform block within a transform performing area so as to improve image encoding/decoding efficiency.

Technical Solution

According to an embodiment of the present invention, a method of decoding an image includes: determining a transform performing; partitioning the determined transform performing area in to at least one sub transform block by using at least one of a QT partition and a BT partition; and performing inverse-transform for the at least one sub transform block.

In the image decoding method, in the determining of the transform performing area, the transform performing area may be determined on the basis of an intra-prediction mode of a current prediction block in association with a current transform block.

In the image decoding method, in the determining of the transform performing area, when the intra-prediction mode of the current prediction block is a horizontal directional prediction mode, a left area of the current transform block may be determined as the transform performing area, when the intra-prediction mode of the current prediction block is a vertical directional prediction mode, an upper area of the current transform block may be determined as the transform performing area, and when the intra-prediction mode of the current prediction block is not a horizontal directional prediction mode, nor a vertical directional prediction mode, a left upper area of the current transform block may be determined as the transform performing area.

In the image decoding method, in the determining of the transform performing area, the transform performing area may be determined on the basis of a specific frequency area of a current transform block.

In the image decoding method, the specific frequency area may be determined on the basis of a predefined value.

In the image decoding method, the inverse-transform may be any one of primary inverse-transform and secondary inverse-transform.

In the image decoding method, the at least one sub transform block may be a 2D sub transform block.

In the image decoding method, the method may further include: determining a coefficient scan method of the sub transform block; and resorting the 2D sub transform block on the basis of the determined coefficient scan method.

In the image decoding method, in the determining of the coefficient scan method of the sub transform block, the coefficient scan method of the sub transform block may be determined on the basis of at least one of an intra-prediction mode of a current prediction block in association with a current transform block, and a transform base of the current transform block.

In the image decoding method, in the determining of the coefficient scan method of the sub transform block, any one of a vertical directional scan, a horizontal directional scan, and a 45-degree diagonal directional scan may be determined as the scan method.

In the image decoding method, in the resorting of the 2D sub transform block on the basis of the determined coefficient scan method, the 2D sub transform block may be resorted to a 1D sub transform block on the basis of the determined coefficient scan method.

According to an embodiment of the present invention, an image encoding method includes: determining a transform performing area; partitioning the determined transform performing area into at least one sub transform block by using at least one of a QT partition and a BT partition; and performing transform for the at least one sub transform block.

In the image encoding method, in the determining of the transform performing area, the transform performing area may be determined on the basis of an intra-prediction mode of a current prediction block in association with a current transform block.

In the image encoding method, in the determining of the transform performing area, when the intra-prediction mode of the current prediction block is a horizontal directional prediction mode, a left area of the current transform block may be determined as the transform performing area, when the intra-prediction mode of the current prediction block is a vertical directional prediction mode, an upper area of the current transform block may be determined as the transform performing area, and when the intra-prediction mode of the current prediction block is not a horizontal directional prediction mode, nor a vertical directional prediction mode, a left upper area of the current transform block may be determined as the transform performing area.

In the image encoding method, in the determining of the transform performing area, the transform performing area may be determined on the basis of a specific frequency area of a current transform block.

In the image encoding method, the specific frequency area may be determined on the basis of a predefined value.

In the image encoding method, the transform may be any one of primary transform and secondary transform.

In the image encoding method, the at least one sub transform block may be a 2D sub transform block.

In the image encoding method, the method further includes: determining a coefficient scan method of the sub transform block; and resorting the 2D sub transform block on the basis of the determined coefficient scan method.

In the image encoding method, in the determining of the coefficient scan method of the sub transform block, the coefficient scan method of the sub transform block may be determined on the basis of at least one of an intra-prediction mode of a current prediction block in association with a current transform block, and a transform base of the current transform block.

In the image encoding method, in the determining of the coefficient scan method of the sub transform block, any one of a vertical directional scan, a horizontal directional scan, and a 45-degree diagonal directional scan may be determined as the scan method.

In the image encoding method, in the resorting of the 2D sub transform block on the basis of the determined coefficient scan method, the 2D sub transform block may be resorted to a 1D sub transform block on the basis of the determined coefficient scan method.

According to the present invention, a computer readable recording medium stores a bitstream, wherein the bitstream is generated by an image encoding method including: determining a transform performing area; partitioning the determined transform performing area into at least one sub transform block by using at least one of a QT partition and a BT partition; and performing transform for the at least one sub transform block.

Advantageous Effects

According to the present invention, there is provided an image encoding/decoding method and apparatus, wherein compression efficiency can be improved.

In addition, according to the present invention, there is provided an image encoding/decoding method and apparatus, the method and apparatus being capable of adaptively determining a transform performing area in a transform block, and a partition shape of a sub transform block within the transform performing area so as to improve image encoding/decoding efficiency.

In addition, according to the present invention, there is provided an image encoding/decoding method and apparatus, the method and apparatus being capable of adaptively determining a scan method of a sub transform block within a sub transform block within a transform performing area so as to improve image encoding/decoding efficiency.

MODE FOR INVENTION

Figure 1:
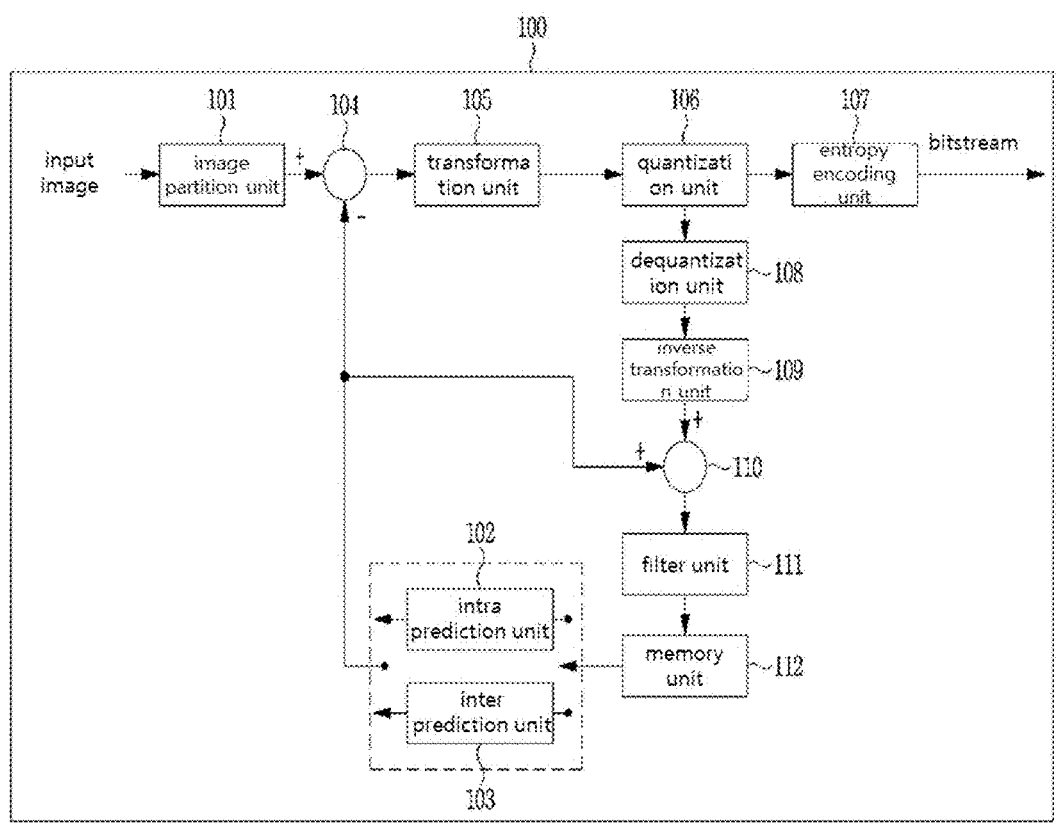
FIG. 1 is a block diagram schematically showing an image encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. Referring to the drawings, similar reference numerals are used to refer to similar components.

Terms used in the specification, "first", "second", etc. can be used to describe various components, but the components are not to be construed as being limited to the terms. The terms are only used to differentiate one component from other components. For example, the "first" component may be named the "second" component without departing from the scope of the present invention, and the "second" component may also be similarly named the "first" component. The term "and/or" includes a combination of a plurality of items or any one of a plurality of terms.

It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening therebetween. In contrast, it should be understood that when an element is referred to as being "directly coupled" or "directly connected" to another element, there are no intervening elements present The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention Hereinafter, embodiments of the present invention will be described in detail with reference to the accompanying drawings. The same constituent elements in the drawings are denoted by the same reference numerals, and a repeated description of the same elements will be omitted.

FIG. 1 is a block diagram showing an image encoding apparatus according to an embodiment of the present invention.

Referring to FIG. 1, the encoding apparatus 100 may include an image partition unit 101, an intra-prediction unit 102, an inter-prediction unit 103, a subtractor 104, a transform unit 105, a quantization unit 106, an entropy encoding unit 107, a dequantization 108, an inverse-transform unit 109, an adder 110, a filter unit 111, and a memory 112.

Each component shown in FIG. 1 is shown independently to represent different characteristic functions in the image encoding apparatus, and do not mean that each component is necessarily configured separately in a hardware or software unit. That is, each component is separately described for the convenience of description. At least two components may be incorporated into a single component or one component may be divided into a plurality of components. An embodiment in which components are incorporated into a single component or one component may be divided into a plurality of components also falls within the scope of the present invention.

Furthermore, some elements may not serve as necessary elements to perform an essential function in the present invention, but may serve as selective elements to improve performance. The present invention may be embodied by including only necessary elements to implement the spirit of the present invention excluding elements used to improve performance, and a structure including only necessary elements excluding selective elements used to improve performance is also included in the scope of the present invention.

The image partition unit 101 may perform partition for an input image into at least one block. Herein, the input image may have various shapes and sizes such as picture, slice, tile, segment, etc. The block may mean a coding unit (CU), a prediction unit (PU) or a transform unit (TU).

The image partition unit 101 may perform partition from a coding unit of a maximum size (hereinafter, referred as maximum coding block) to a coding unit of a minimum size (hereinafter, referred as minimum coding block). The partition may be performed on the basis of at least one of a quad tree (QT) and a binary tree (BT). A QT is a method of partitioning an upper layer block into four lower layer blocks having a width and a height to be half of the upper layer block. A BT is a method of partitioning an upper layer block into two lower layer blocks having a width or height to be a half of the upper layer block. Through partition based on a BT, a block may have a square shape as well as a non-square shape.

Hereinafter, in an embodiment of the present invention, a coding unit may be used as a meaning of a unit of performing encoding, or may mean as a meaning of a unit of performing decoding. In addition, the coding unit may mean a coding block.

The prediction units 102 and 103 may include an inter-prediction unit 103 performing inter-prediction and an intra-prediction unit 102 performing intra-prediction. The prediction units 102 and 103 may generate a prediction block by using a neighbor pixel of a block that is currently predicted (hereinafter, referred as prediction block) in a current original block, or by using a reference picture that has been already decoded. Herein, at least one prediction block may be generated within a coding lock. When a prediction block within a coding block is one, the prediction block may have a shape identical to the coding block.

A method of predicting a video signal mainly consists intra-prediction and inter-prediction. Intra-prediction is a method of generating a prediction block by using neighbor pixels of a current block, and inter-prediction is a method of generating a prediction block by searching for a block that is closest to a current block in a reference picture that has been already encoded and decoded.

The prediction units 102 and 103 may determine an optimized prediction mode of a prediction block by performing various methods such as rate-distortion optimization (RDO) for a residue block obtained by subtracting a prediction block from a current original block. An RDO formula may be as Formula 1 below.

$$J(\Phi,\lambda)=D(\Phi)+\lambda R(\Phi) \quad \text{[Formula 1]}$$

Herein, D may be degradation by quantization, R may be a rate of a compression stream, J may be an RD cost, Φ may be a coding mode, and λ may be a Lagranginan multiplier and a scaling correcting coefficient to reconcile between error quantities.

A residue value (residue block) between a generated prediction block and an original block may be input to the transform unit 105. In addition, prediction mode information used for prediction, and motion vector information may be encoded in the entropy encoding unit 107 with the residue value and transmitted to the decoder. When a specific coding mode is used, the prediction block may not be generated through the prediction units 102 and 103, and the original block may be possibly encoded as it is and transmitted to the decoding unit.

The intra-prediction unit 102 may generate a prediction block on the basis of reference pixel information adjacent to a current block which is pixel information of a current picture. When a prediction mode of a neighbor block of a current block for which intra-prediction will be performed is inter-prediction, a reference pixel included in a neighbor block to which inter-prediction is applied may be replaced with a reference pixel within another neighbor block for which intra-prediction is applied. In other words, when a reference pixel is not available, non-available reference pixel information may be used by replacing the same with at least one available reference pixel.

In intra-prediction, a prediction mode may have a directional prediction mode using reference pixel information according to a prediction direction, and a non-directional mode not using directional information when performing prediction. A mode for predicting luma information and a mode for predicting chroma information may be different, intra-prediction mode information or predicted luma signal information used for predicting the luma information may be used for predicting the chroma information.

The inter-prediction unit 103 may generate a prediction block on the basis of information of at least one picture among pictures before or after a current picture. In some cases, a prediction block may be generated on the basis of information of a partial area within the current picture which has been already encoded. The inter-prediction unit 103 may include a reference picture interpolation unit, a motion estimation unit, and a motion compensation unit.

The subtractor 104 may generate a residue block of a current block by subtracting a prediction block generated in the intra-prediction unit 102 or inter-prediction unit 103 from a currently encoded block.

The transform unit 105 may generate a transform block by applying a transform method such as DCT, DST, KLT (Karhunen Loeve Transform), etc. to a residue block including residue data. The transform block may be a unit used for transform and quantization. Transform may be performed for the entire residue block, or transform may be performed by partitioning the residue block by a sub-block unit. Herein, as a partition method of a transform block, a partition method based on a QT or a BT may be used.

Meanwhile, a transform method may be determined on the basis of an intra-prediction mode of a prediction block used for generating a residue block. For example, according to an intra-prediction mode, DCT may be used for a horizontal direction, and DST may be used for a vertical direction.

The quantization unit 106 may generate a quantized transform block by performing quantization for transform blocks transformed in a frequency area in the transform unit 105. A quantization coefficient may vary according to a block or image importance degree.

The quantization unit 106 may generate and output a quantized transform block having a quantized coefficient (quantized transform coefficient) by performing quantization for transform coefficients of a transform block generated in the transform unit 105. Herein, as a quantization method, dead zone uniform threshold quantization (DZUTQ) or quantization weighted matrix, etc. may be used.

A value calculated in the quantization unit 106 may be provided to the dequantization unit 108 and the entropy encoding unit 107.

The at least one of the transform unit 105 and the quantization unit 106 may be selectively included in the image encoding apparatus 100. In other words, the image encoding apparatus 100 may perform at least one of transform and quantization for residue data of a residue block, or encode a residue block by skipping transform and quantization. When any one of transform an quantization is not performed, or both of transform and quantization are not performed in the image encoding apparatus 100, a block input to the entropy encoding unit 107 is typically called a transform block.

The entropy encoding unit 107 entropy encodes input data. Entropy encoding, may use, various encoding methods, for example, exponential Golomb, context-adaptive variable length coding (CAVLC), and context-adaptive binary arithmetic coding (CABAL).

The entropy encoding unit 107 may encode various pieces of information such as coefficient information of a residue value of a coding block from the prediction units 102 and 103 and block type information of a block, prediction mode information, partition block information, prediction block information and transmission unit information, motion vector information, reference frame information, interpolation information of a block, filtering information, etc. In the entropy encoding unit 107, a coefficient of a transform block may be encoded in various types of flags representing a coefficient other than 0, a coefficient having an absolute value greater than 1 or 2, a coefficient sign, etc. in a partial block within the transform block. A coefficient that is not encoded by the above flag may be encoded through an absolute value of a difference between the coefficient encoded by the flag and a coefficient of an actual transform block. The dequantization unit 108 and the inverse-transform unit 109 may perform dequantization for values quantized in the quantization unit 106, and perform inverse-transform for values transformed in the transform unit 105. A residue value (residual) generated in the dequantization unit 108 and the inverse-transform unit 109 may be used for generating a reconstructed block by being added to a prediction block predicted through the motion estimation unit, and the motion compensation unit included in the prediction units 102 and 103, and the intra-prediction unit 102. The adder 110 may generate a reconstructed block by adding the prediction block generated in the prediction units 102 and 103, and the residue block generated through the inverse-transform unit 109.

The filter unit 111 may include at least one of a deblocking filter, an offset correction unit, and an adaptive loop filter (ALF).

A deblocking filter may remove a block distortion generated by a boundary between blocks within a reconstructed picture. In order to determine whether or not to perform deblocking, whether or not to apply a deblocking filter to a current block may be determined on the basis of a pixel included in some rows or columns included in a block. When the deblocking filter is applied to the block, a strong filter or a weak filter may be applied according to deblocking filtering strength. In addition, when applying a deblocking filter and performing vertical filtering and horizontal filtering, vertical directional filtering and horizontal directional filtering may be performed in parallel.

The offset correction unit may correct an offset for an image for which deblocking is performed with an original image in a pixel unit. In order to correct an offset for a specific picture, a method of dividing pixels included in an image into a predetermined number of areas, determining an area for which an offset will be applied, and applying an offset to the corresponding area, or a method of applying an offset by taking into account edge information of each pixel may be used.

ALF (adaptive loop filtering) may be performed on the basis of a value obtained by comparing a reconstructed image for which filtering is applied and an original image. Pixels included in an images may be divided into predetermined groups, a single filter that will be applied to each group may be determined, and thus filtering may be selectively applied to each group. Information of whether or not to apply ALF may be transmitted for each coding unit (CU) for a luma signal, and a shape and a filter coefficient of an ALF filter which will be applied may vary according to each block. In addition, regardless of characteristic of a block to which the filter will be applied, ALF having the same shape (fixed shape) may be applied.

The memory unit 112 may store a reconstructed block or picture calculated in the filter unit 111, and the stored reconstructed block or picture may be provided to the prediction units 102 and 103 when performing inter-prediction.

Figure 2:
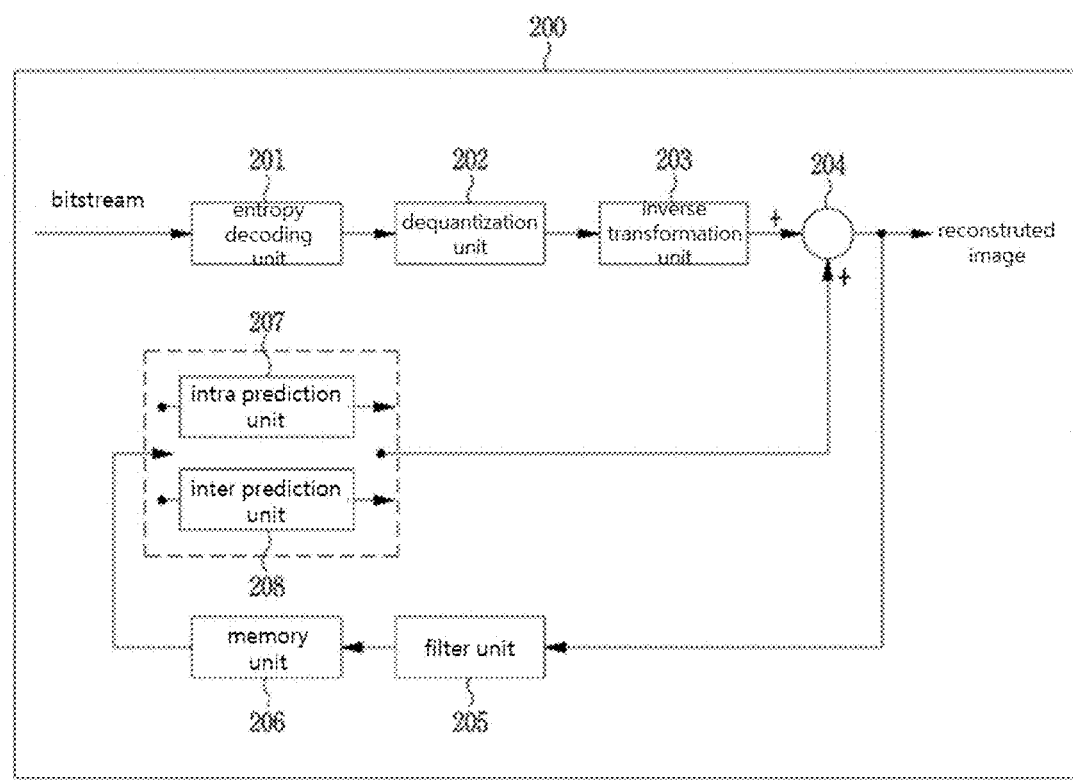
FIG. 2 is a block diagram schematically showing an image decoding apparatus according to an embodiment of the present invention.

FIG. 2 is a block diagram showing image decoding apparatus 200 according to an embodiment of the present invention.

Referring to FIG. 2, the image decoding apparatus 200 may include an entropy decoding unit 201, a dequantization unit 202, an inverse-transform unit 203, an adder 204, a filter unit 205, a memory 206, and prediction units 207 and 208.

When a bitstream generated in the image encoding apparatus 100 is input to the image decoding apparatus 200, the input bitstream may be decoded according to the process opposite to that performed in the image encoding apparatus 100.

The entropy decoding unit 201 may perform entropy decoding by the opposite process to that of the entropy encoding unit 107 of the image encoding apparatus 100. For example, in association with a method performed in the image encoder, various methods may be applied such as exponential Golomb, context-adaptive variable length coding (CAVLC), context-adaptive binary arithmetic coding (CABA), etc. In the entropy decoding unit 201, a coefficient of a transform block may be decoded on the basis of various types of flags representing a coefficient other than 0, a coefficient having an absolute value greater than 1 or 2, a coefficient sign, etc. in a partial block unit within the transform block. A coefficient that is not represented by the above flag may be decoded by adding the coefficient represented by the flag and a signaled coefficient.

The entropy decoding unit 201 may decode information related to intra-prediction and inter-prediction which are performed in the encoder. The dequantization unit 202 may generate a transform block by performing quantization for a quantized transform block. The dequantization unit 202 operates identically with the dequantization unit 108 of FIG. 1.

The inverse-transform unit 203 may generate a residue block by performing inverse-transform for a transform block. Herein, a transform method may be determined on the basis of a prediction method (inter or intra-prediction), a size or shape or both of a block, and information of an intra-prediction mode. The inverse-transform unit 203 operates substantially identically with the inverse-transform unit 109 of FIG. 1.

The adder 204 may generate a reconstructed block by adding a prediction block generated in the intra-prediction unit 207 or inter-prediction unit 208 and a residue block generated through the inverse-transform unit 203. The adder 204 operates substantially identically with the adder 110 of FIG. 1.

The filter unit 205 decreases various types of noises occurring in reconstructed blocks. The filter unit 205 may include a deblocking filter, an offset correction unit, and ALF.

When information of whether or not a deblocking filter is applied to a corresponding block or picture is provided and a deblocking filter is applied, information of whether a strong filter is applied or a weak filter is applied may be provided. The deblocking filter of the image decoding apparatus 200 may be provided with information related to a deblocking filter which is provided from the image encoding apparatus 100, and the image decoding apparatus 200 may perform deblocking filtering for the corresponding block.

The offset correction unit may perform offset correction for a reconstructed image on the basis of information of an offset correction type, and an offset value which are applied to an image when performing encoding.

ALF may be applied to a coding unit on the basis of information of whether or not to apply ALF, ALF coefficient information, etc. which are provided from the image encoding apparatus 100. Such ALF information may be provided by being included in a specific parameter set. The filter unit 205 operates substantially identically with the filter unit 111 of FIG. 1.

The memory 206 may store a reconstructed block generated by the adder 204. The memory 206 operates substantially identically to the memory unit 112 of FIG. 1.

The prediction units 207 and 208 may generate a prediction block on the basis of information related to generating a prediction block provided from the entropy decoding unit 201, and a block that has been already decoded or picture information which is provided in the memory 206.

The prediction units 207 and 208 may include an intra-prediction unit 207 and an inter-prediction unit 208. Although not shown separately, the prediction units 207 and 208 may further include a prediction unit determining unit. The prediction unit determining unit may receive various pieces of information input from the entropy decoding unit 201 such as prediction unit information, prediction mode information of an intra-prediction method, motion prediction related information of an inter-prediction method, etc., determine a prediction unit in a current coding unit, and determine whether inter-prediction is performed in the prediction unit or intra-prediction is performed in the prediction unit. The inter-prediction unit 208 may perform inter-prediction for a current prediction unit by using information necessary for inter-prediction of the current prediction unit which is provided from the image encoding apparatus 100 on the basis of information included in at least one picture among pictures before or after a current picture to which the current prediction unit belongs. Alternatively, inter-prediction may be performed on the basis of information of a partial area that has been already reconstructed within the current picture to which the current prediction unit belongs.

In order to perform inter-prediction, which method among a skip mode, a merge mode, and an AMVP mode is used as a motion prediction method of a prediction block included in a corresponding coding block may be determined on the basis of the coding block.

The intra-prediction unit 207 may generate a prediction block by using pixels that have been already reconstructed and which are located adjacent to a currently encoding block.

The intra-prediction unit 207 may include an adaptive intra smoothing (AIS) filter, a reference pixel interpolation unit, and a DC filter. The AIS filter may be a filter performing filtering for a reference pixel of a current block, and whether or not to apply a filter may be adaptively determined according to a prediction mode of a current prediction block. AIS filtering may be performed for a reference pixel of a current block by using a prediction mode of a prediction block, and AIS filter information which are provided from the image encoding apparatus 100. When the prediction mode of the current block is a mode not performing AIS filtering, an AIS filter may not be applied.

The reference pixel interpolation unit of the intra-prediction unit 207 may generate a reference pixel at a location of a fractional unit by performing interpolation for the reference pixel when a prediction mode of a prediction block is a prediction block performing intra-prediction on the basis of a pixel value obtained by performing interpolation for the reference pixel. The generated reference pixel at the location of the fractional unit may be used as a prediction pixel of a pixel within a current block. When a prediction mode of a current prediction block is a prediction mode generating a prediction block without performing interpolation for a reference pixel, interpolation for the reference pixel may not be performed. A DC filter may generate a prediction block through filtering when a prediction mode of a current block is a DC mode.

The intra-prediction unit 207 operates substantially identically with the intra-prediction unit 102 of FIG. 1.

The inter-prediction unit 208 generates an inter-prediction block by using a reference picture, and motion information which are stored in the memory 206. The inter-prediction unit 208 operates substantially identically with the inter-prediction unit 103 of FIG. 1.

Based on the above description, an image decoding method and an image encoding method according to an embodiment of the present invention will be described.

The image encoding apparatus according to the present invention may perform transform two times (primary transform and secondary transform) for a transform coefficient so as to improve energy concentration. Accordingly, the image decoding apparatus according to the present invention may perform inverse-transform two times (secondary inverse-transform and primary inverse-transform). The same transform method may be used for primary transform and secondary transform, or different transform methods may be used.

Transform and inverse-transform according to an embodiment of the present invention will be described with reference to FIGS. 3 and 4.

Figure 3:
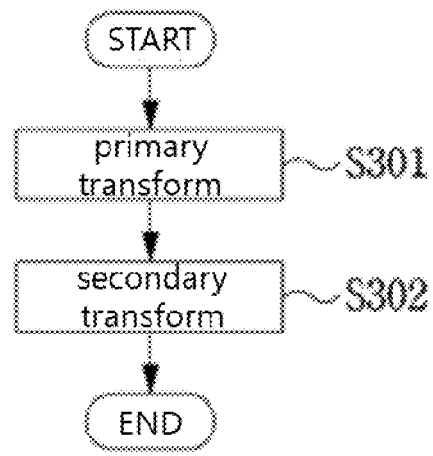
FIG. 3 is a view of a flowchart showing a transform method of the image encoding apparatus according to an embodiment of the present invention.

FIG. 3 is a view of a flowchart showing a transform method of an image encoding apparatus according to the present invention.

Referring to FIG. 3, in S301, the image encoding apparatus may perform primary transform for a residue block in a transform block unit. Subsequently, in S302, the image encoding apparatus may perform secondary transform for transform coefficients of a transform block for which primary transform is performed. Secondary transform may be performed for all or a partial area of the transform block for which primary transform is performed.

Figure 4:
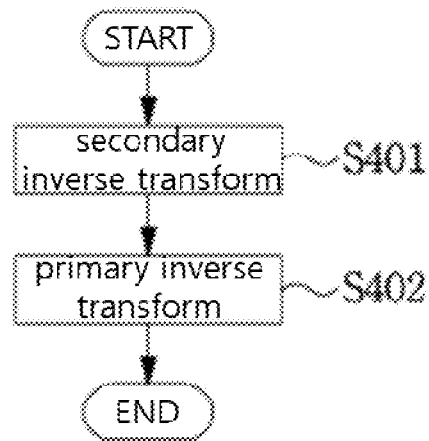
FIG. 4 is a view of a flowchart showing a transform method of the image decoding apparatus according to an embodiment of the present invention.

FIG. 4 is a view of a flowchart showing a transform method of an image decoding apparatus according to the present invention.

Referring to FIG. 4, the image decoding apparatus may perform secondary inverse-transform for a dequantized block. Subsequently, the image decoding apparatus may perform primary inverse-transform for a transformed block for which secondary inverse is performed.

Hereinafter, a method of determining a transform performing area for which transform is performed will be described with reference to FIGS. 5 to 10.

Figure 7:
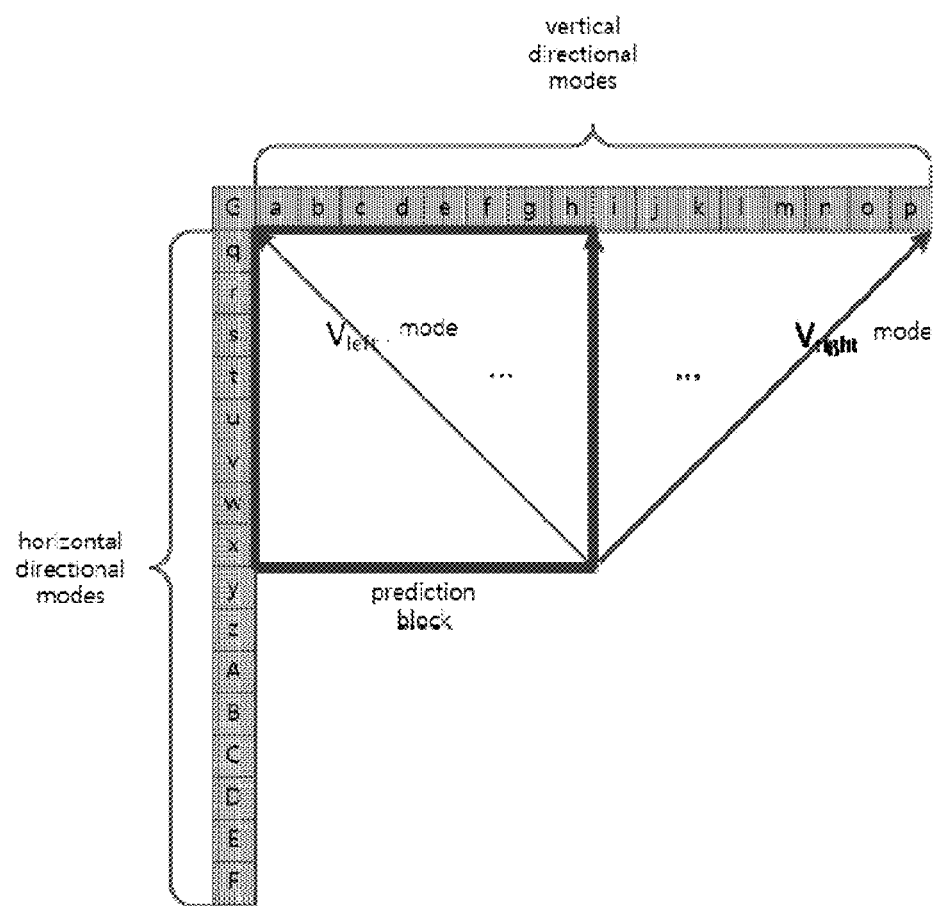
FIG. 7 is a view showing a vertical directional prediction mode according to an embodiment of the present invention.
Figure 8:
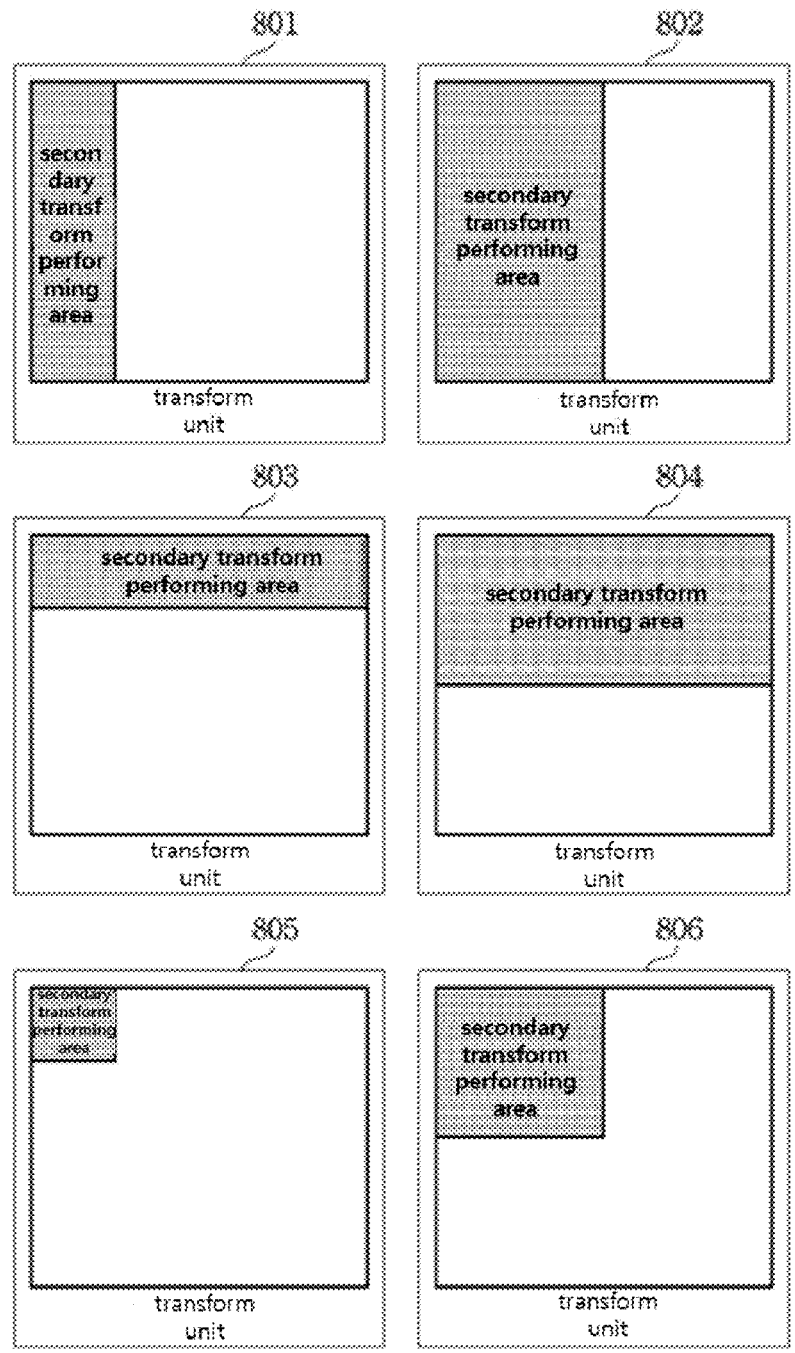
FIG. 8 is a view showing a left area, an upper area, and a left upper area within a current transform block according to an embodiment of the present invention.
Figure 9:
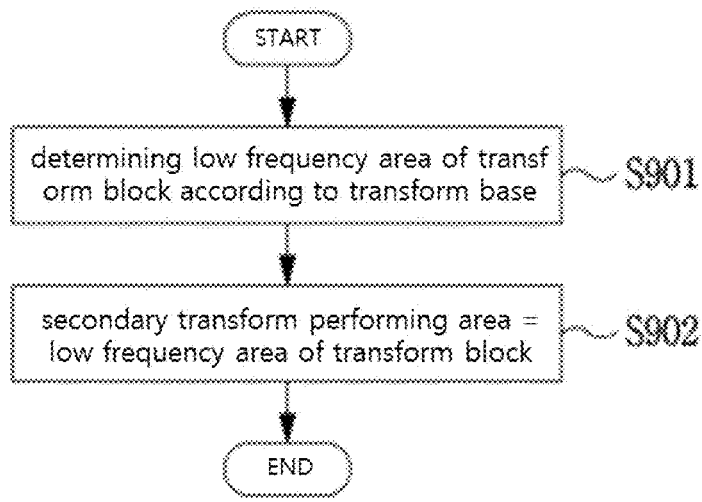
FIG. 9 is a view of a flowchart showing a method of determining a transform performing area on the basis of a frequency area of a transform block according to an embodiment of the present invention.
Figure 10:
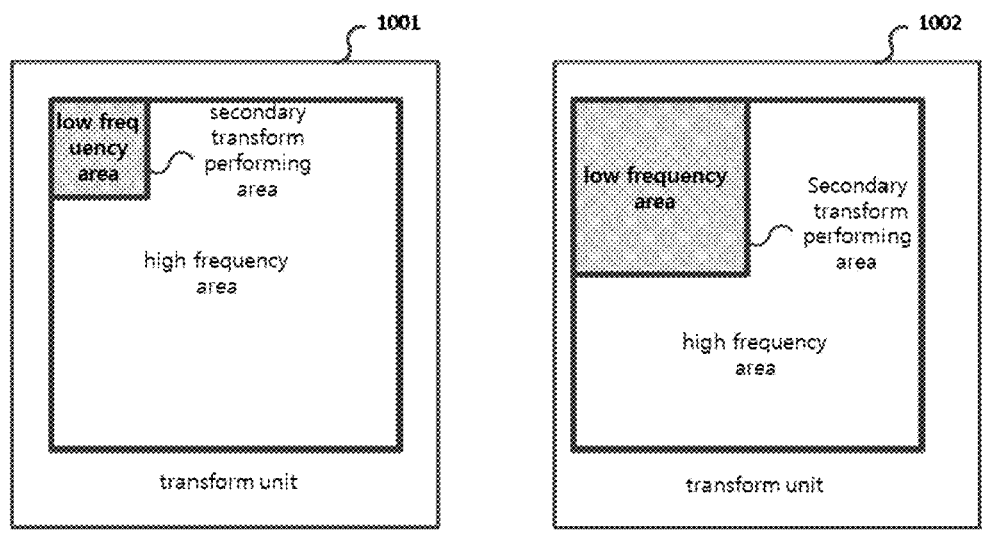
FIG. 10 is a view showing an example of determining a transform performing area on the basis of a frequency area of a transform block.

Herein, FIGS. 5 to 8 are views showing a method of determining a transform performing area on the basis of a prediction mode, and FIGS. 9 and 10 are views showing a method of determining a transform performing area on the basis of a frequency area of a transform block.

First, a method of determining a transform performing area on the basis of a prediction mode according to an embodiment of the present invention will be described.

Figure 5:
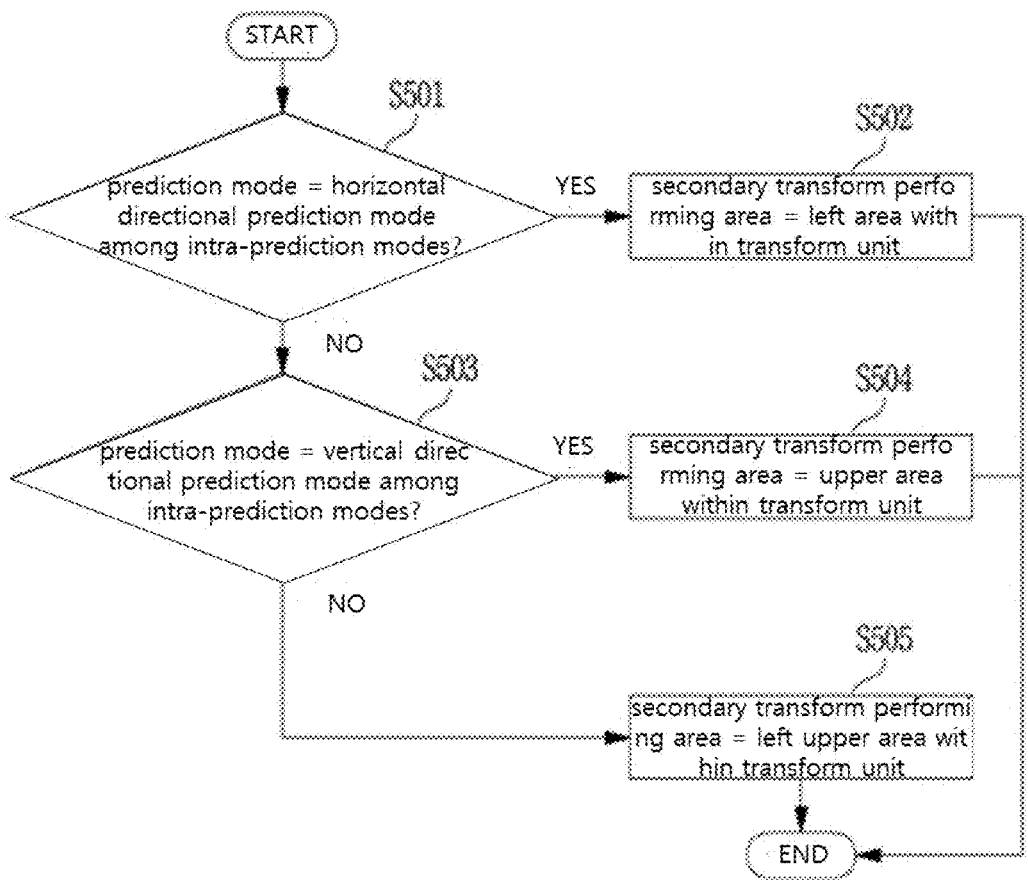
FIG. 5 is a view of a flowchart showing a method of determining transform performing area on the basis of an intra-prediction mode according to an embodiment of the present invention.

FIG. 5 is a view of a flowchart showing a method of determining a transform performing area on the basis of an intra-prediction mode.

Figure 6:
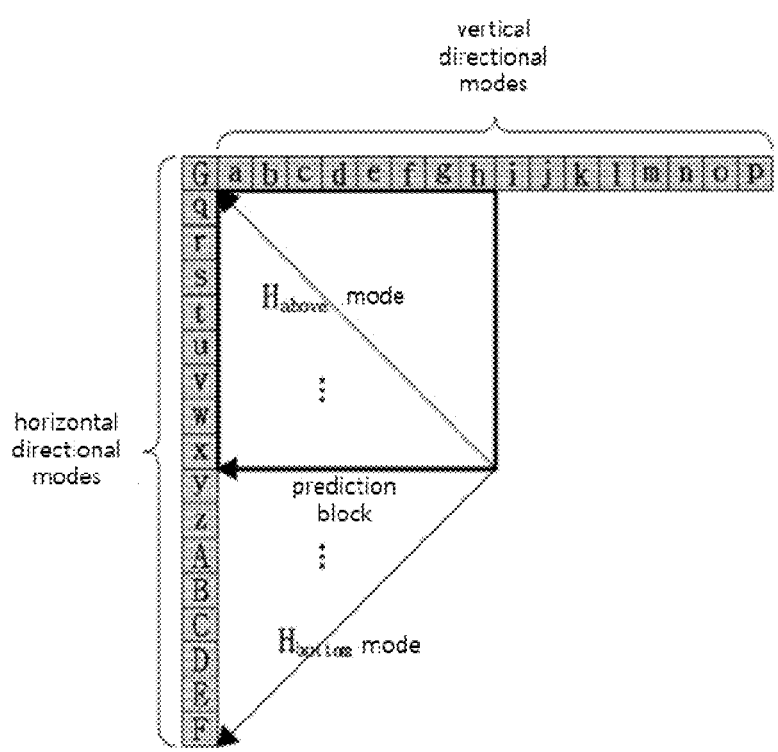
FIG. 6 is a view showing a horizontal directional prediction according to an embodiment of the present invention mode.

Referring to FIG. 5, in S501, whether or not an intra-prediction mode of a prediction block in association with a current transform block is a horizontal directional prediction mode is determined. Herein, the horizontal directional prediction mode may mean at least one intra-prediction mode performing intra-prediction by using a reference pixel of a left area of a prediction block. FIG. 6 is a view showing a horizontal directional prediction mode according to an embodiment of the present invention.

Referring to FIG. 6, an $H_{Above}$ mode may mean a prediction mode having maximum index information among intra-prediction modes belonging to a horizontal directional prediction mode range, and an $H_{Bottom}$ mode may mean a prediction mode having minimum index information among the intra-prediction modes belonging to the horizontal direction prediction range. Accordingly, angular prediction modes between the $H_{Above}$ mode and the $H_{Bottom}$ mode may mean a horizontal directional prediction mode.

In S501, when the intra-prediction mode of the prediction block in association with the current transform block is a horizontal directional prediction mode (S501—YES), S502 may be performed.

In S502, a secondary transform performing area may be determined as the left area of the current transform block.

In S501, when the intra-prediction mode of the prediction block in association with the current transform block is not a horizontal directional prediction mode (S501—NO, S503 may be performed.

In S503, whether or not the intra-prediction mode of the prediction block in association with the current transform block is a vertical directional prediction mode is determined. Herein, the vertical directional prediction mode may mean at least one intra-prediction mode performing intra-prediction by using a reference pixel of an upper area of the prediction block. FIG. 7 is a view showing a vertical directional prediction mode according to an embodiment of the present invention.

Referring to FIG. 7, a $V_{left}$ mode may mean a prediction mode having minimum index information among intra-prediction modes belonging to a vertical directional prediction mode range, and a $V_{right}$ mode may mean a prediction mode having maximum index information among the intra-prediction modes belonging to the vertical direction prediction range. Accordingly, angular prediction modes between the $V_{left}$ mode and the $V_{right}$ mode may mean a vertical directional prediction mode.

In S503, when the intra-prediction mode of the prediction block in association with the current transform block is a vertical directional prediction mode (S503—YES), S504 may be performed.

In S504, the secondary transform performing area may be determined as an upper area within the current transform block.

In S503, when the intra-prediction mode of the prediction block in association with the current transform block is not a vertical directional prediction mode (S503—NO), S505 may be performed.

In S505, the secondary transform performing area may be determined as a left upper area within the current transform block.

FIG. 8 is a view showing a left area, an upper area, and a left upper area within a current transform block according to an embodiment of the present invention.

Referring to FIG. 8, when a secondary transform area is determined as a left area within a current transform block as described in FIG. 5, the left area may be a ¼ left area 801 or ½ left area 802 within a transform block.

In addition, when a secondary transform area is determined as an upper area within a current transform block, the upper area may be a ¼ upper area 803 or ½ upper area 804 of the transform block.

In addition, when a secondary transform area is determined as a left upper area within a current transform block, the left upper area may be a ¼ left upper area 805 or ½ left upper area 806 of the transform block.

In FIGS. 5 to 8, a case of performing secondary transform in the image encoding apparatus has been described. However, it is not limited thereto, and the image decoding apparatus may determine a secondary inverse-transform performing area by using the same method described above.

Subsequently, a method of determining a method of determining a transform performing area on the basis of a frequency area of a transform block according to an embodiment of the present invention.

FIG. 9 is a view of a flowchart showing a method of determining a method of determining a transform performing area on the basis of a frequency area of a transform block.

Referring to FIG. 9, in S901, a low frequency area within a transform block may be determined on the basis of a transform base. Herein, the low frequency area within the transform block may vary according to a transform base. Subsequently, in S902, a secondary transform performing area may be determined as the low frequency area within the transform block.

Meanwhile, a frequency range specifying the low frequency area may be identically fixed in the image encoding apparatus and the image decoding apparatus. Alternatively, additional information may be transmitted from the image encoding apparatus to the image decoding apparatus so as to determine a frequency range specifying a low frequency area.

FIG. 10 is a view showing an example of determining a transform performing area on the basis of a frequency area of a transform block.

In the image encoding apparatus according to an embodiment of the present invention, a low frequency area of a transform block after primary transform may be a left upper area within the transform block. In addition, in the image decoding apparatus, a low frequency area of a transform block after dequantization may be a left upper area within a transform block. In FIG. 10, a secondary transform performing area is shown under the above assumption.

Referring to FIG. 10, in 1001, the image encoding apparatus/image decoding apparatus may determine a left upper 1/16 area of a transform block as a low frequency area, and determine the corresponding area as a secondary transform performing area.

Alternatively, in 1002, the image encoding apparatus/image decoding apparatus transform block may determine a left upper ¼ area as a low frequency area, and determine the corresponding area as a secondary transform performing area.

In FIGS. 5 to 10, a method of determining a transform performing area for which secondary transform or secondary inverse-transform is performed has been described, but it is not limited thereto. A transform performing area for which primary transform or primary inverse-transform is performed may be determined by using the same method.

In addition, according to an embodiment, the entire transform block may be determined as a transform performing area.

In addition, the image encoding apparatus and the image decoding apparatus may identically determine a secondary transform performing area and a secondary inverse-transform performing area by using the method described above, or information of a secondary transform performing area determined by the method described above may be encoded in the image encoding apparatus and transmitted to the image decoding apparatus. Herein, the corresponding information may be transmitted in an upper layer level (video layer, sequence layer, picture layer, slice layer, coding block layer, etc.) or in a transform block unit.

Hereinafter, a method of partitioning a primary transform performing area or secondary transform performing area will be described with reference to FIGS. 11 to 15. Hereinafter, a transform block obtained by partitioning an upper layer transform block is defined as a sub transform block.

Figure 11:
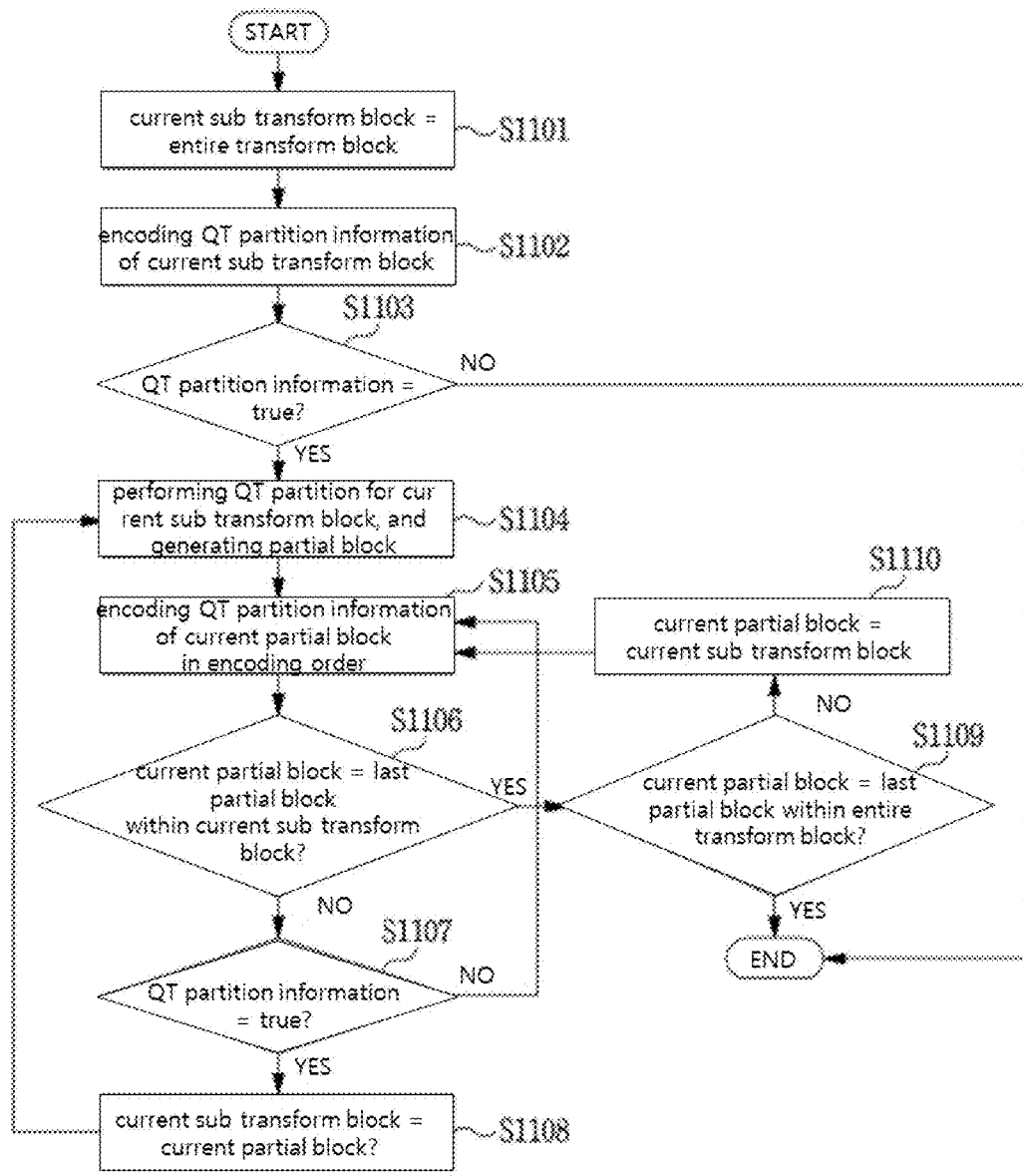
FIGS. 11 and 12 are views showing a quad tree (QT) partition of a transform block according to an embodiment of the present invention.
Figure 12:
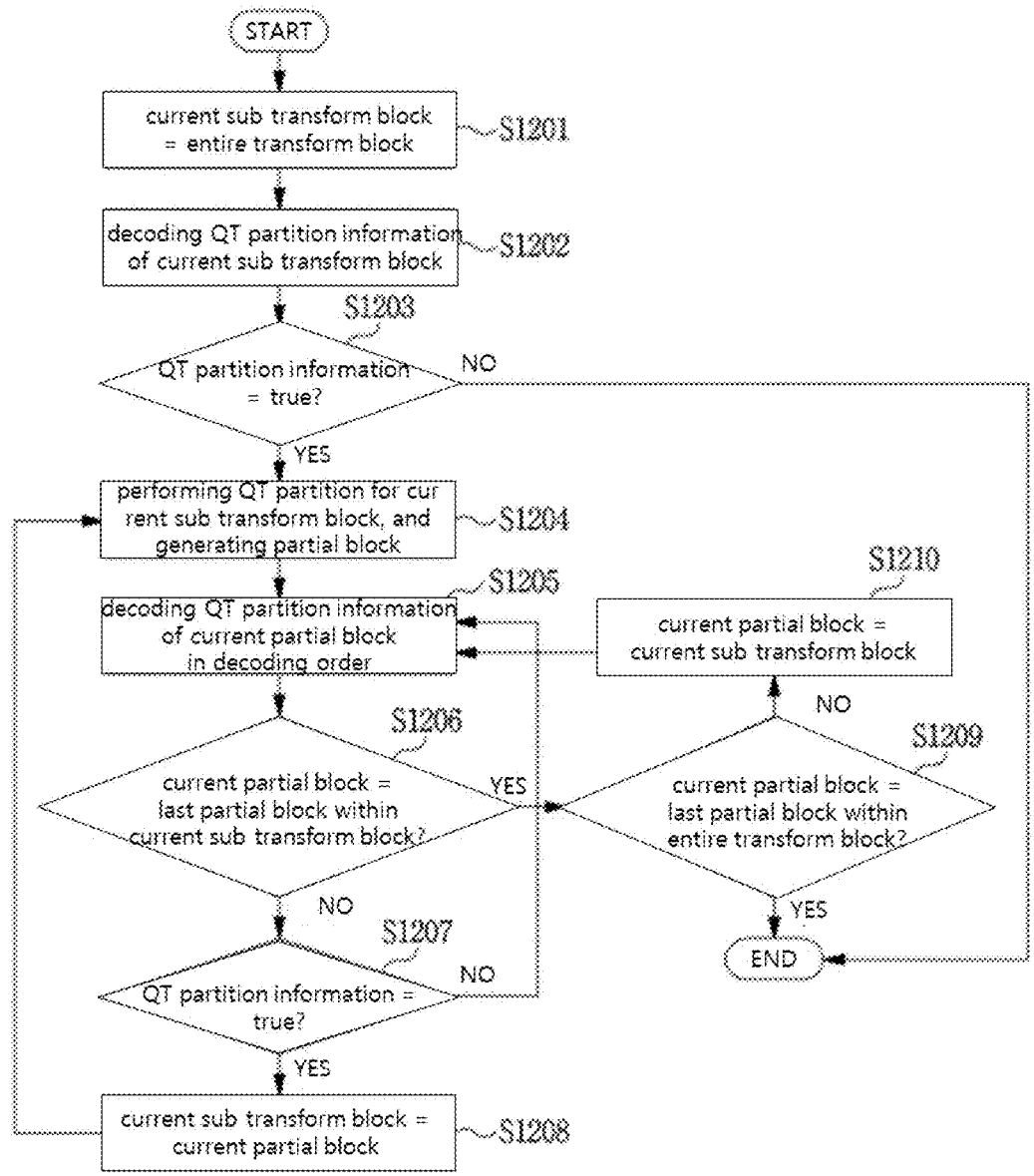

FIGS. 11 and 12 are views showing a QT partition of a transform block.

FIG. 11 is a view of a flowchart showing a method of encoding optimized QT partition information when performing QT partition for a transform block into a sub transform block. Herein, the entire transform block may mean a transform block having an uppermost partition depth, a current sub transform block may mean a sub transform block that is currently encoded, and a current partial block may mean a partial block that is currently encoded among partial blocks obtained by partitioning the current sub transform block.

Referring to FIG. 11, in S1101, the entire transform block may be set as a current sub transform block.

Subsequently, in S1102, QT partition information in the current sub transform block may be encoded.

Subsequently, in S1103, whether QT partition information that has been already encoded in the current sub transform block is TRUE or FALSE may be determined.

When the QT partition information encoded in the current sub transform block is FALSE (S1103—NO), QT partition encoding may be ended.

On the contrary, when the QT partition information encoded in the current sub transform block is TRUE (S1103—YES), S1104 may be performed.

In S1104, a partial block may be generated by performing a QT partition for the current sub transform block.

Subsequently, in S1105, QT partition information of the partial block that is currently encoded (hereinafter, referred as current partial block) may be encoded in an encoding order of partial blocks obtained by partitioning the current sub transform block.

Subsequently, in S1106, whether or not the current partial block is a partial block corresponding to the last encoding order within the current sub transform block may be determined.

When the current partial block is the partial block corresponding to the last encoding order within the current sub transform block (S1106—YES), S1109 may be performed.

In S1109, whether or not the current partial block is a partial block corresponding to the last encoding order within the entire transform block may be determined.

When the current partial block is the partial block corresponding to the last encoding order within the entire transform block (S1109—YES), QT partition encoding may be ended.

On the contrary, when the current partial block is not the partial block corresponding to the last encoding order within the entire transform block (S1109—NO), in S1110, the current sub transform block is set as a current partial block having an upper layer depth, and encoding of QT partition information of a partial block having the following encoding order of the current partial block having the upper layer depth is performed by returning to S1105.

In S1107, when the current partial block is not the partial block corresponding to the last encoding order within the current sub transform block in S1106 (S1106—NO), whether QT partition information of the corresponding partial block is TRUE or FALSE may be determined. Herein, when the corresponding information is FALSE (S1107—NO), encoding of QT partition information of a partial block having the following encoding order of the current partial block may be performed by returning to S1105.

On the contrary, when the corresponding information is TRUE (S1107—YES), in S1108, the current partial block is set as a current sub transform block having a lower layer depth, and retuning to S1104 may be performed.

Meanwhile, a maximum/minimum size of a transform block for which a QT partition is available, a maximum depth for which a QT partition is available, a depth for which partition is available in a current transform block, etc. may be identically fixed in the image encoding apparatus and the image decoding apparatus, or the same may be transmitted form the image encoding apparatus to the image decoding apparatus through an upper layer header (slice layer, picture layer, sequence layer, vide layer, etc.).

FIG. 12 is a view of a flowchart showing a method of performing a QT partition for a transform block into a sub transform block by decoding QT partition information.

Referring to FIG. 12, in S1201, the entire transform block may be set as a current sub transform block.

Subsequently, in S1202, QT partition information in the current sub transform block may be decoded.

Subsequently, in S1203, whether or not the QT partition information decoded in the current sub transform block is TRUE or FALSE may be determined.

When the QT partition information decoded in the current sub transform block is FALSE (S1203—NO), QT partition decoding may be ended.

On the contrary, when the QT partition information decoded in the current sub transform block is TRUE (S1203—YES), S1204 may be performed.

In S1204, four partial blocks may be generated by performing a QT partition for the current sub transform block.

Subsequently, in S1205, QT partition information of a partial block that is currently decoded (hereinafter, referred as current partial block) may be decoded in a decoding order of partial blocks obtained by partitioning the current sub transform block.

Subsequently, in S1206, whether or not the current partial block is a partial block corresponding to the last decoding order within the current sub transform block may be determined.

When the current partial block is the partial block corresponding to the last decoding order within the current sub transform block (S1206—YES), S1209 may be performed.

In S1209, whether or not the current partial block is a partial block corresponding to the last decoding order within the entire transform block may be determined.

When the current partial block is the partial block corresponding to the last decoding order within the entire transform block (S1209—YES), QT partition decoding may be ended.

On the contrary, when the current partial block is not the partial block corresponding to the last decoding order within the entire transform block current partial (S1209—NO), in S1210, the current sub transform block may be set as a current partial block having an upper layer depth, and decoding of QT partition information of a partial block having the following decoding order of the current partial block having the upper layer depth may be performed by returning to S1205.

In S1207, when the current partial block is not the partial block corresponding to the last decoding order within the current sub transform block in S1206 (S1206—NO), whether or not QT partition information of the corresponding partial block is TRUE or FALSE may be determined. Herein, when the corresponding information is FALSE (S1207—NO), decoding of QT partition information of a partial block of the following decoding order of the current partial block may be decoded by returning to S1205.

On the contrary, when the corresponding information is TRUE (S1207—YES), in S1208, the current partial block may be set as a current sub transform block having a lower layer depth, and returning to S1204 may be performed.

Figure 13:
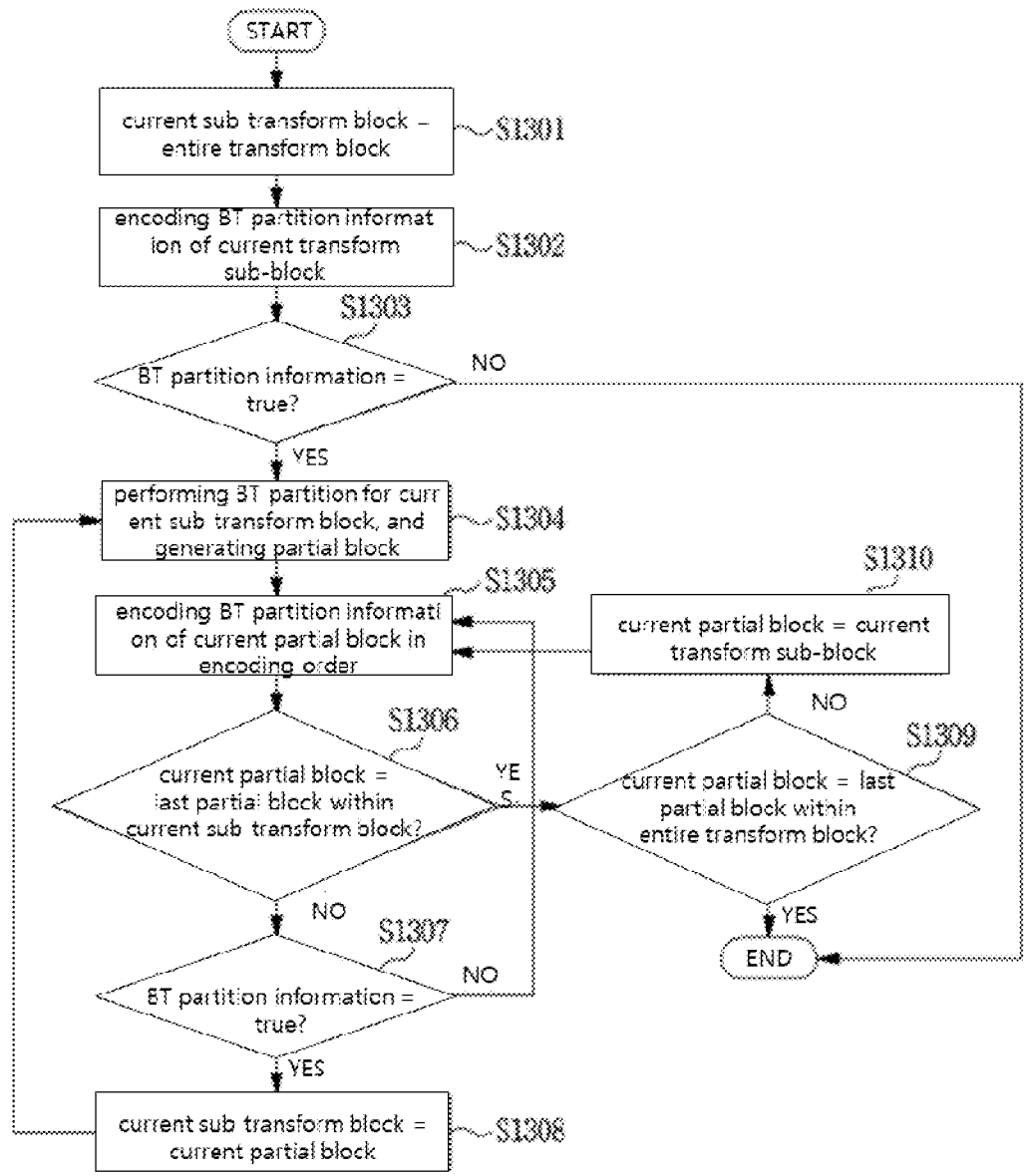
FIGS. 13 and 14 are views of flowcharts showing a BT partition of a transform block according to an embodiment of the present invention.
Figure 14:
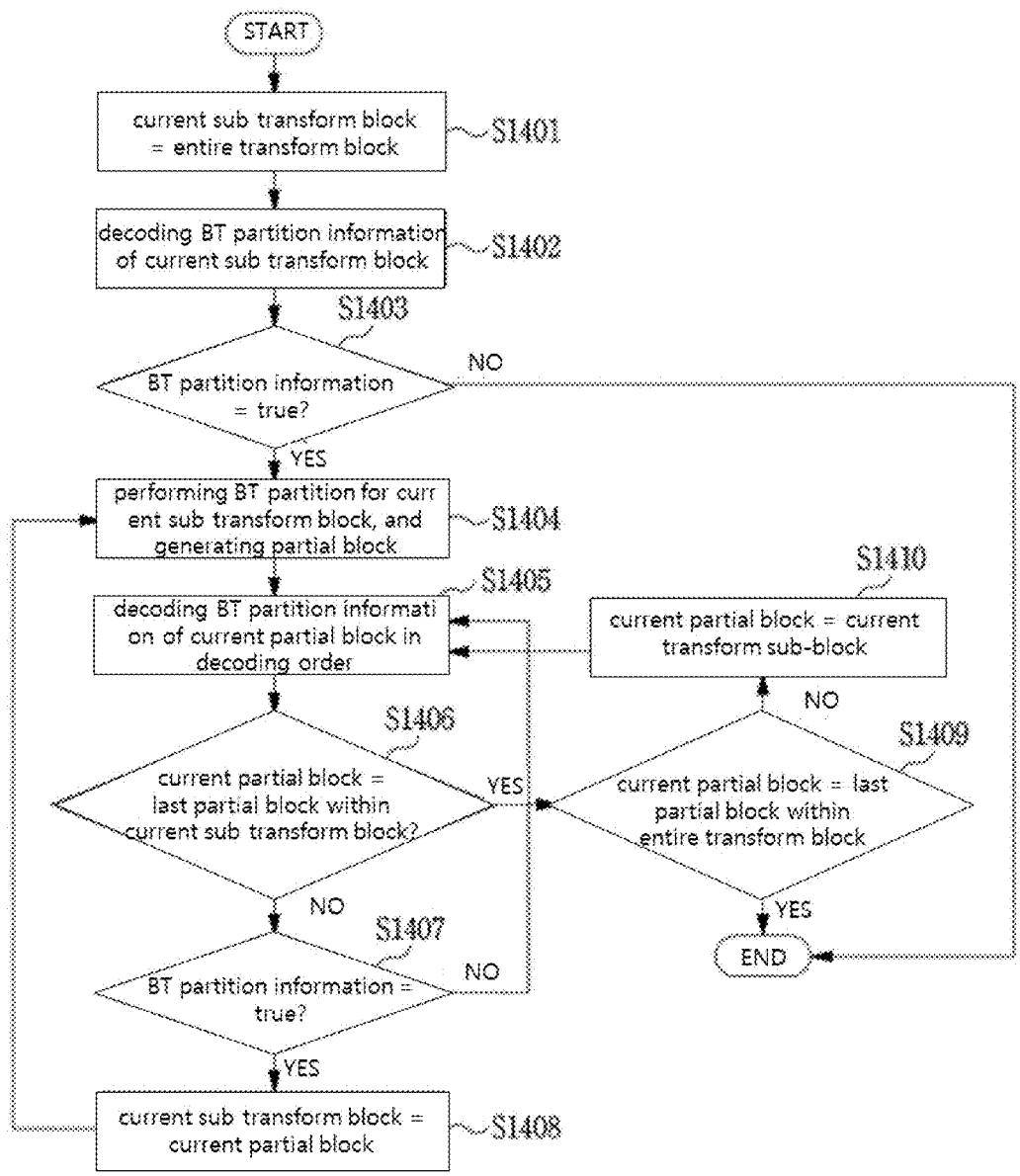

FIGS. 13 and 14 are views showing a BT partition of a transform block.

In FIGS. 13 and 14, the rest of the process is the same with examples of FIGS. 11 and 12 except that a QT partition is changed to a BT partition and QT partition information is changed to BT partition information. Accordingly, description of FIGS. 13 and 14 will be omitted.

Figure 15:
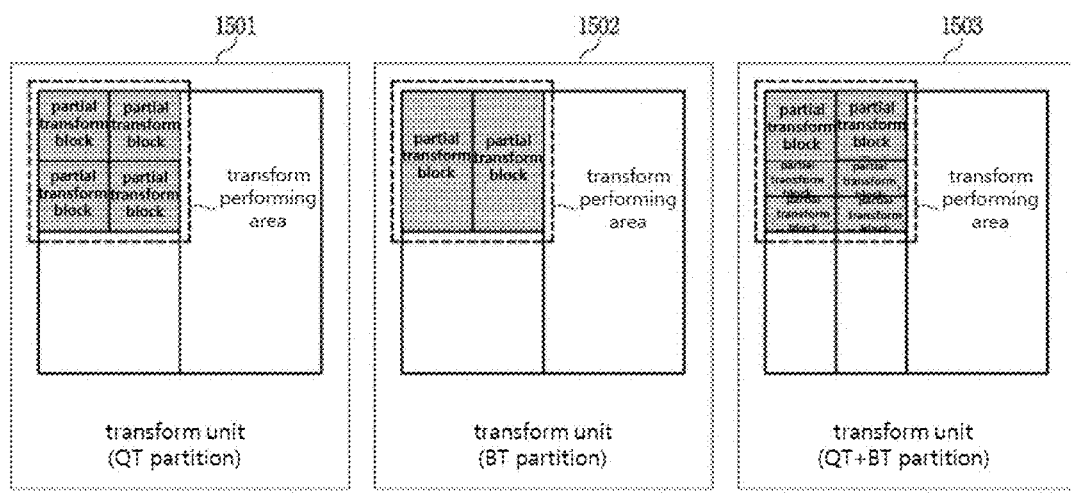
FIG. 15 is a view showing an example where a transform performing area is partitioned into transform blocks by using a QT partition and a BT partition.

FIG. 15 is a view showing an example where a transform performing area is partitioned into a partial transform block by using QT partition and BT partition. Herein, the transform performing area may mean the entire transform block.

In FIG. 15, the transform performing area is assumed to be a left upper of a current block.

Referring to FIG. 15, 1501 shows a shape of a partial transform block obtained by performing a QT partition method for the entire transform block, and 1502 shows a shape of a partial transform block obtained by performing a BT partition method for the entire transform block. In addition, 1503 shows a shape of a partial transform block obtained by performing a QT partition method and a BT partition method for the entire transform block.

Meanwhile, the image encoding apparatus and the image decoding apparatus may determine a partition shape of a transform block on the basis of a size of the entire transform block within a transform performing area.

In an example, when both of horizontal and vertical lengths of the entire transform block are equal to or greater than 8, transform may be perform for a left upper 8×8 sub transform block, otherwise, transform may be perform for a left upper 4×4 sub transform block.

According to the above embodiment, a shape of a sub transform block partition within a transform performing area may be determined, and transform or inverse-transform may be performed in a sub transform block unit. Hereinafter, a coefficient scan method and a resorting method which are possibly performed after or before performing secondary transform within a secondary transform performing area in a sub transform block unit will be described. Herein, the secondary transform performing area and secondary transform may be a concept including a secondary inverse-transform performing area and secondary inverse-transform.

Figure 16:
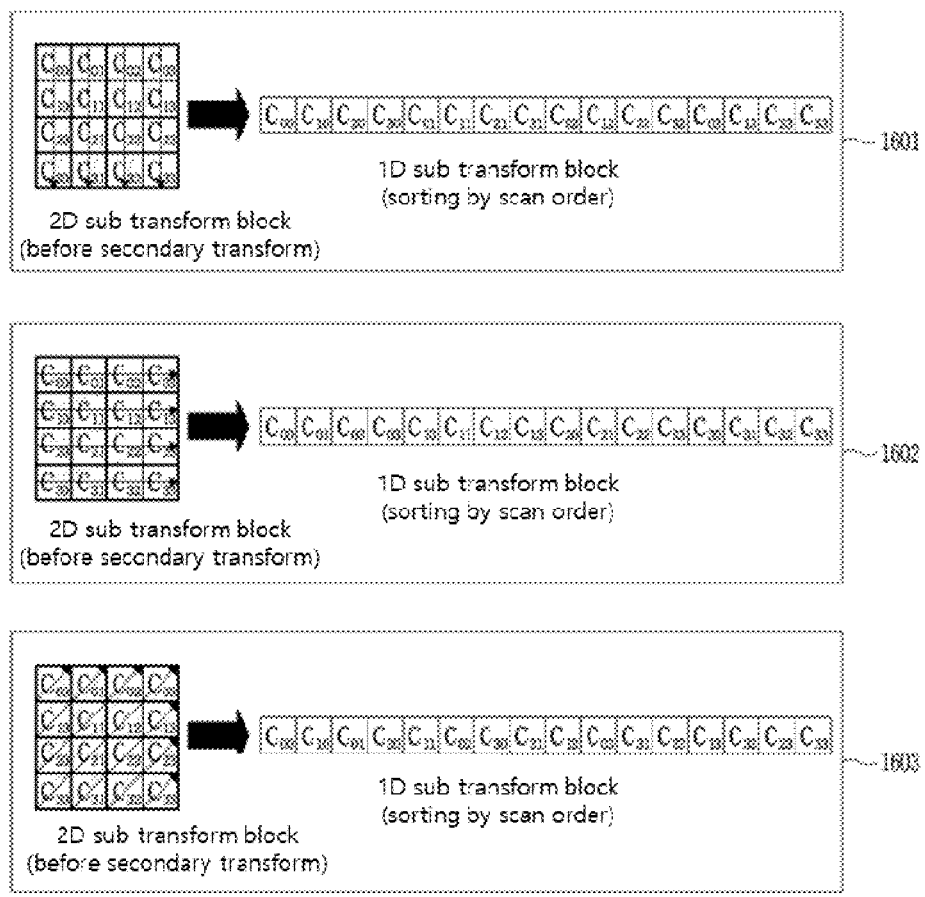
FIG. 16 is a view showing an example of a scanning method and a resorting method of a two-dimensional (2D) sub transform block when converting a 2D sub transform block to a one-dimensional (1D) sub transform block to perform a 1D transform method rather than a 2D transform method.

FIG. 16 is a view showing an example of a scanning method and a resorting method of a 2D sub transform block when converting a 2D sub transform block to a 1D sub transform block to perform a 1D transform method rather than a 2D transform method.

Referring to FIG. 16, 1601 shows a method of resorting a 2D sub transform block, for which primary transform is performed before performing secondary transform, to a 1D sub transform block by scanning the same in a vertical direction. Herein, a vertical directional scan order may be C00, C10, C20, C01, ..., C23, and C33, and mapping to a 1D sub transform block may be performed in the same order.

1602 shows a method of resorting a 2D sub transform block, for which primary transform is performed before performing secondary transform, to a 1D sub transform block by scanning the same in a horizontal direction. Herein, a horizontal directional scan order may be C00, C01, C02, C03, C10, ..., C32, and C33, and mapping to a 1D sub transform block may be performed in the same order.

1603 show a method of resorting a 2D sub transform block, for which primary transform is performed before performing secondary transform, to a 1D sub transform block by scanning in a 45-degree diagonal direction. Herein, a 45-degree diagonal directional scan order may be C00, C10, C01, C20, C11, ..., C23, and C33, and mapping to a 1D sub transform block may be performed in the same order.

Figure 17:
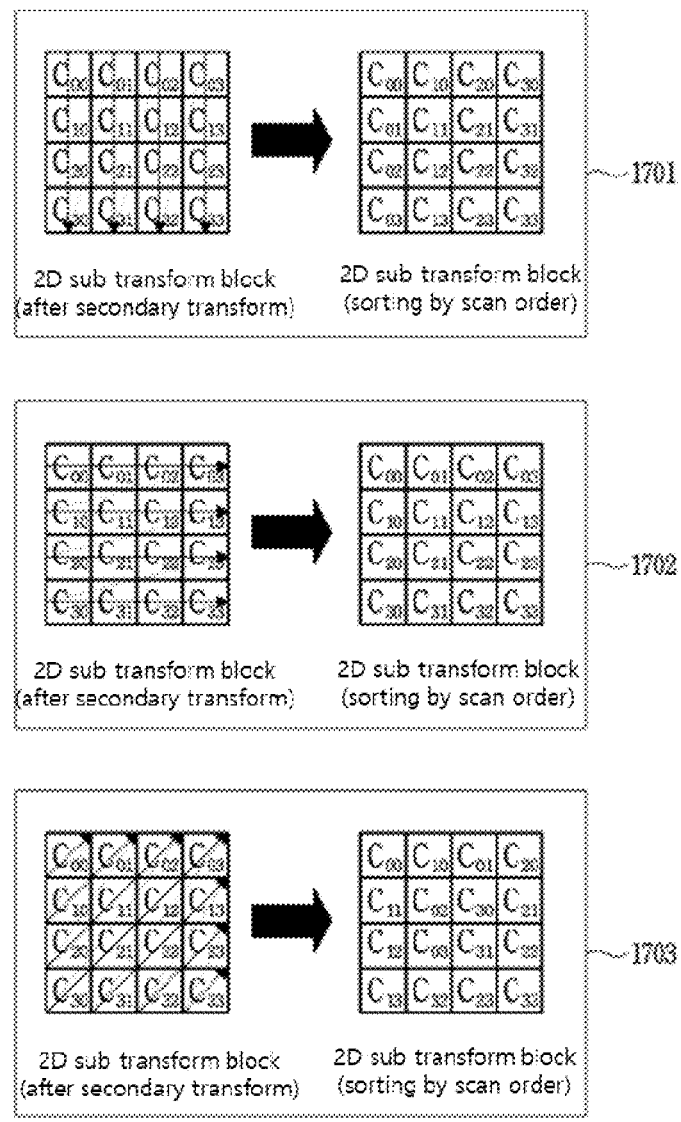
FIG. 17 is a view showing an example of a scanning method and a resorting method of a 2D sub transform block.

FIG. 17 is a view showing an example of a scan method and a resorting method of a 2D sub transform block.

Referring to FIG. 17, 1701 show a method of resorting a 2D sub transform block, for which secondary transform is performed, to a 2D sub transform block by scanning the same in a vertical direction after performing secondary transform. Herein, a vertical directional scan order may be C00, C10, C20, C01, ..., C23, and C33, and mapping to a 2D sub transform block may be performed in the same order.

1702 shows a method of resorting a 2D sub transform block, for which secondary transform is performed, to a 2D sub transform block by scanning the same in a horizontal direction after performing secondary transform. Herein, a horizontal directional scan order may be C00, C01, C02, C03, C10, ..., C32, and C33, and mapping to a 2D sub transform block may be performed in the same order.

1703 shows a method of resorting a 2D sub transform block, for which secondary transform is performed, to a 2D sub transform block by scanning the same in a 45-degree diagonal direction after performing secondary transform. Herein, a 45-degree diagonal directional scan order may be C00, C10, C01, C20, C11, ..., C23, and C33, and mapping to a 2D sub transform block may be performed in the same order.

Meanwhile, a method shown in FIG. 17 may be performed before performing secondary transform.

In addition, as a scan method of FIGS. 16 and 17, various directional scan methods may be used other than a vertical direction, a horizontal direction, and a 45-degree diagonal direction. In addition, in FIGS. 16 and 17, secondary transform or secondary inverse-transform is used as an example, but the above method may be applied to a case of primary transform and primary inverse-transform.

Hereinafter, a method of determining a coefficient scan method for a sub transform block described above will be described.

According to an embodiment of the present invention, in a coefficient scan method of a sub transform block, and a scan method may be variably performed in a sub transform block unit according to a prediction mode.

Figure 18:
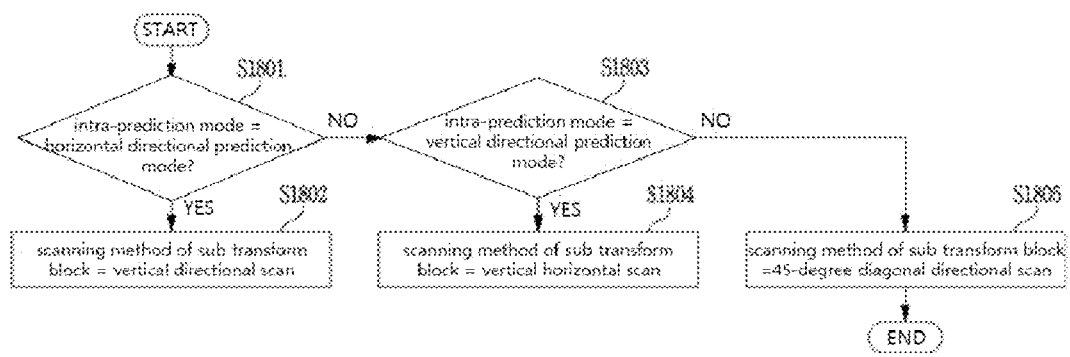
FIG. 18 is a view of a flowchart showing a method of determining a scan method of a sub transform block on the basis of a prediction mode of a current block according to an embodiment of the present invention.

FIG. 18 is a view of a flowchart showing a method of determining a scan method for a sub transform block according to a prediction mode performed when generating a current transform block.

Referring to FIG. 18, in S1801, whether or not a prediction mode performed for generating a current transform block is one of horizontal directional prediction mode among intra-prediction modes may be determined.

Subsequently, in S1802, when the result of S1801 is TRUE, a scan method for a sub transform block may be determined as a vertical directional scan method.

Subsequently, in S1803, when the result of S1801 is FALSE, whether or not the prediction mode performed when generating the current transform block is one of vertical directional prediction modes among intra-prediction modes may be determined.

Subsequently, in S1804, when the result of S1803 is TRUE, a scan method for a sub transform block may be determined as a horizontal directional scan method.

Subsequently, in S1805, when the result of S1803 is FALSE, a scan method for a sub transform block may be determined as a 45-degree diagonal directional scan method. In other words, in S1805, when the prediction mode performed for generating the current transform block does not belong to vertical directional prediction modes, nor horizontal directional prediction modes of intra-prediction modes, a scan method for a sub transform block may be determined as a 45-degree diagonal directional scan method.

According to another embodiment of the present invention, in a coefficient scan method for a sub transform block, a scan method may be differently performed in a sub transform block unit according to a transform base.

Figure 19:
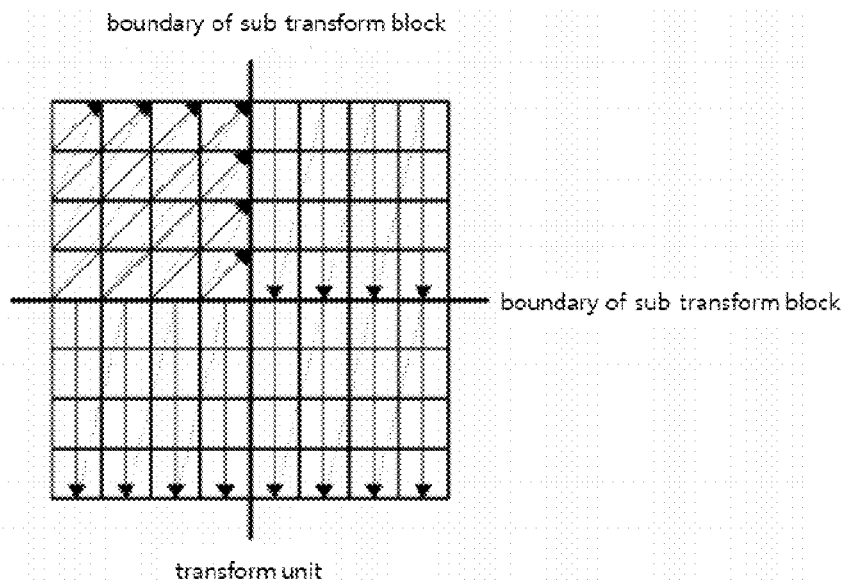
FIG. 19 is a view showing a method of determining a scan method of a sub transform block on the basis of a transform base according to an embodiment of the present invention.

FIG. 19 is a view showing a method of determining a scan method for a sub transform block according to a transform base.

Referring to FIG. 19, a 45-degree diagonal directional scan method may be determined for a left upper sub transform block, and a vertical direction scan method may be determined for remaining sub transform blocks as a sub transform block scan method.

The image encoding apparatus may determine an optimized scan method for each sub transform block through RDO, and transmit the optimized scan method to the image decoding apparatus by encoding the same.

Figure 20:
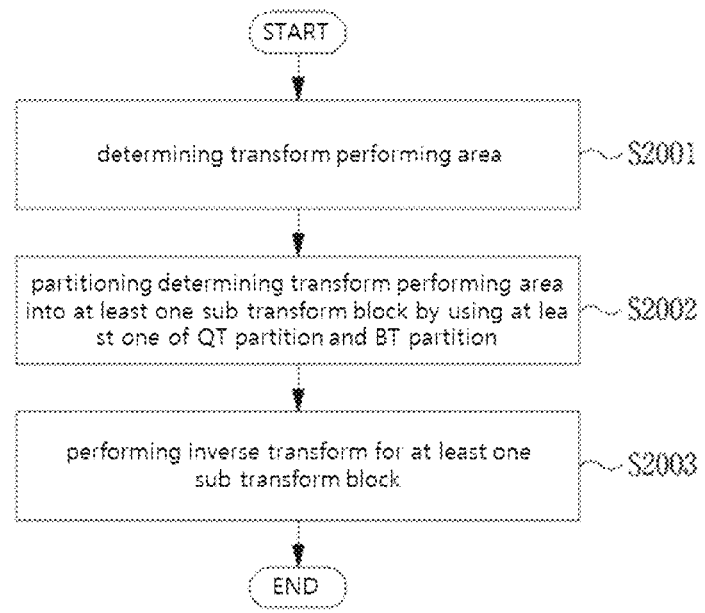
FIG. 20 is a view of a flowchart showing an image decoding method according to an embodiment of the present invention.

FIG. 20 is a view of a flowchart showing an image decoding method according to an embodiment of the present invention.

Referring to FIG. 20, in S2001, the image decoding apparatus may determine a transform performing area.

Herein, the image decoding apparatus may determine the transform performing area on the basis of an intra-prediction mode of a current prediction block in association with a current transform block. In detail, the image decoding apparatus may determine a left area of the current transform block as the transform performing area when the intra-prediction mode of the current prediction block is a horizontal directional prediction mode, and determine an upper area of the current transform block as the transform performing area when the intra-prediction mode of the current prediction block is a vertical directional prediction mode. When the intra-prediction mode of the current prediction block is not a horizontal directional prediction mode nor vertical directional prediction mode, the image decoding apparatus may determine a left upper area of the current transform block as the transform performing area.

Meanwhile, the image decoding apparatus may determine the transform performing area on the basis of a specific frequency area of the current transform block. Herein, the specific frequency area may be determined on the basis of a predefined value.

In S2002, the image decoding apparatus may perform partition for the determined transform performing area into at least one sub transform block by using at least one of a QT partition and a BT partition.

Subsequently, in S2003, the image decoding apparatus may perform inverse-transform for the at least one sub transform block. Herein, inverse-transform may be any one of primary inverse-transform and secondary inverse-transform.

Meanwhile, the at least one sub transform block may be a 2D sub transform block. Herein, the image decoding apparatus may further perform: determining a coefficient scan method of the sub transform block; and resorting the 2D sub transform block on the basis of the determined coefficient scan method.

Herein, the image decoding apparatus may determine the coefficient scan method of the sub transform block on the basis of an intra-prediction mode of the current prediction block in association with the current transform block.

The image decoding method of FIG. 20 may be identically performed in the image encoding apparatus as an image encoding method. Herein, inverse-transform may be changed to transform.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

In addition, the embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

The range of the present invention includes software or machine-executable instructions (for example, operating system, application, firmware, program, etc.) so that operation according to various embodiments are executed in an apparatus or computer, and a non-transitory computer-readable medium storing such software or instructions so as to be executable in an apparatus or computer.

INDUSTRIAL APPLICABILITY

The present invention may be used for an image encoding/deciding apparatus.

The invention claimed is:

1. A method of decoding an image, the method comprising:
    determining a secondary transform performing area of a current transform block;
    performing secondary inverse-transform on the determined secondary transform performing area; and
    performing primary inverse-transform on a primary transform performing area,
    wherein the secondary transform performing area is determined based on a low frequency area in a left upper area of the current block, and the secondary inverse-transform is not performed on an area that is not the secondary transform performing area,
    the primary transform performing area is determined equal to an entire area of the current block, and
    the low frequency area of the current block is determined based on a size of the current transform block.

2. The method of claim 1, wherein the current transform block is a sub transform block partitioned from an upper layer transform block.

3. The method of claim 2, wherein the sub transform block is a block partitioned from the upper layer transform block by a binary tree partitioning.

4. The method of claim 2, wherein whether to divide the upper layer transform block into the sub transform block is determined based on at least of a width and a height of the upper layer transform block.

5. The method of claim 1, further comprising determining transform coefficients of the secondary transform performing area according to coefficient information of the current transform block, wherein the secondary inverse-transform is performed on the transform coefficients of the secondary transform performing area.

6. The method of claim 5, wherein performing secondary inverse-transform on the determined secondary transform performing area comprises:
    acquiring a current 1-D transform array by rearranging the current transform block according to a diagonal scan order; and performing the secondary inverse-transform on the current 1-D transform array.

7. An image encoding method, the method comprising:
performing primary transform on a primary transform performing area;
determining a secondary transform performing area of a current transform block; and
performing secondary transform on the determined secondary transform performing area,
wherein the secondary transform performing area is determined based on a low frequency area in a left upper area of the current block, and the secondary transform is not performed on an area that is not the secondary transform performing area,
the primary transform performing area is determined equal to an entire area of the current block, and
the low frequency area of the current block is determined based on a size of the current transform block.

8. The method of claim 7, wherein the current transform block is a sub transform block partitioned from an upper layer transform block.

9. The method of claim 8, wherein the sub transform block is a block partitioned from the upper layer transform block by a binary tree partitioning.

10. The method of claim 8, wherein whether to divide the upper layer transform block into the sub transform block is determined based on at least of a width and a height of the upper layer transform block.

11. A non-transitory computer readable recording medium storing a bitstream, wherein the bitstream is generated by an image encoding method, the method including:
performing primary transform on a primary transform performing area;
determining a secondary transform performing area of a current transform block; and
performing secondary transform on the determined secondary transform performing area,
wherein the secondary transform performing area is determined based on a low frequency area in a left upper area of the current block, and the secondary transform is not performed on an area that is not the secondary transform performing area,
the primary transform performing area is determined equal to an entire area of the current block, and
the low frequency area of the current block is determined based on a size of the current transform block.

12. An image decoding method, the method comprising:
determining a secondary transform performing area of a current transform block;
performing secondary inverse-transform on the determined secondary transform performing area; and
performing primary inverse-transform on a primary transform performing area,
wherein the secondary transform performing area is determined in a left upper area of the current block and is a half size area of the current transform block or a quarter size area of the current transform block,
the secondary inverse-transform is not performed on an area that is not the secondary transform performing area, and
the primary transform performing area is determined equal to an entire area of the current block.

13. The method of claim 12, wherein the transform performing area is an area which divided by one of vertical partition and horizontal partition.

14. An image encoding method, the method comprising:
performing primary transform on a primary transform performing area;
determining a secondary transform performing area of a current transform block; and
performing secondary transform on the determined secondary transform performing area,
wherein the secondary transform performing area is determined in a left upper area of the current block and is a half size area of the current transform block or a quarter size area of the current transform block,
the secondary transform is not performed on an area that is not the secondary transform performing area, and
the primary transform performing area is determined equal to an entire area of the current block.

15. The method of claim 14, wherein the transform performing area is an area which divided by one of vertical partition and horizontal partition.

16. A non-transitory computer readable recording medium storing a bitstream, wherein the bitstream is generated by an image encoding method, the method including:
performing primary transform on a primary transform performing area;
determining a secondary transform performing area of a current transform block; and
performing secondary transform on the determined secondary transform performing area,
wherein the secondary transform performing area is determined in a left upper area of the current block and is a half size area of the current transform block or a quarter size area of the current transform block,
the secondary transform is not performed on an area that is not the secondary transform performing area, and
the primary transform performing area is determined equal to an entire area of the current block.

* * * * *